US010652213B2

(12) United States Patent
Chanda et al.

(10) Patent No.: US 10,652,213 B2
(45) Date of Patent: May 12, 2020

(54) AGENT-LESS MICRO-SEGMENTATION OF A NETWORK

(71) Applicant: Nicira, Inc., Palo Alto, CA (US)

(72) Inventors: Arijit Chanda, San Jose, CA (US); Lifeng Chen, San Jose, CA (US); Sirisha Myneni, Santa Clara, CA (US); Arnold Koon-Chee Poon, San Mateo, CA (US)

(73) Assignee: Nicira, Inc., Palo Alto, CA (US)

( * ) Notice: Subject to any disclaimer, the term of this patent is extended or adjusted under 35 U.S.C. 154(b) by 95 days.

(21) Appl. No.: 15/845,605

(22) Filed: Dec. 18, 2017

(65) Prior Publication Data

US 2019/0190889 A1 Jun. 20, 2019

(51) Int. Cl.
*H04L 29/06* (2006.01)
*H04L 12/813* (2013.01)

(52) U.S. Cl.
CPC .......... *H04L 63/0272* (2013.01); *H04L 47/20* (2013.01); *H04L 63/0263* (2013.01); *H04L 63/1425* (2013.01); *H04L 29/06095* (2013.01); *H04L 69/22* (2013.01)

(58) Field of Classification Search
CPC . H04L 63/20; H04L 63/0263; H04L 63/1416; H04L 12/2803; H04L 12/28; H04L 47/20; H04L 63/205; H04L 41/0803; H04L 63/0272; H04L 63/1408; H04L 63/1441; H04L 67/10; H04L 12/4641; H04W 92/02; G06F 9/45558; G06F 2009/45587; G06F 2009/45595; G06F 9/45533; G06F 2009/45591
See application file for complete search history.

(56) References Cited

U.S. PATENT DOCUMENTS

| | | | |
|---|---|---|---|
| 10,009,383 B2 * | 6/2018 | Woolward | |
| 2006/0136720 A1 | 6/2006 | Armstrong et al. | |
| 2008/0133517 A1 * | 6/2008 | Kapoor et al. | |
| 2008/0289028 A1 | 11/2008 | Jansen et al. | |
| 2009/0279547 A1 | 11/2009 | Mistry et al. | |
| 2011/0251992 A1 * | 10/2011 | Bethlehem et al. | |
| 2014/0230008 A1 | 8/2014 | Feroz et al. | |

\* cited by examiner

*Primary Examiner* — Marsha D Banks Harold
*Assistant Examiner* — Dharmesh J Patel

(57) ABSTRACT

The technology disclosed herein enables the micro-segmentation of a network without agents. In a particular embodiment, a method provides, in a packet-handler controller of a virtual computing environment, determining one or more policies in a first format that identify one or more packet characteristics and how packets with the one or more packet characteristics should be handled within the virtual computing environment. The method further provides converting the one or more policies from the first format to a second format used by a domain controller for one or more computing systems outside of the virtual computing environment. Also, the method provides distributing the one or more policies in the second format to at least one of the one or more computing systems.

20 Claims, 6 Drawing Sheets

AGENT-LESS MICRO-SEGMENTATION OF A NETWORK

TECHNICAL BACKGROUND

Micro-segmentation is a manner of logically grouping and applying policies to workloads on a network. Micro-segmentation is primarily implemented in virtualized computing environments where host computing systems host guests that are networked. A guest may include a guest operating system (OS) executing within a virtual machine, a containerized application, such as one implemented with Docker® technology available from Docker, Inc., or some other form of virtualizing a computing element hosted by a host computing system—including combinations thereof. Implementing micro-segmentation in host computing systems allows each guest on a host computing system to be in a different micro-segmentation group, if necessary or desired. The host computing system therefore handles packets being exchanged with the respective guests in accordance with the network policies associated with each guest's group.

Many networks will include both virtualized computing elements and physical, non-virtualized, computing elements (e.g., servers not acting as hosts). While those physical computing systems may execute similar workloads (e.g., applications) as those executed by guests in a virtual computing environment, micro-segmentation of the workloads may be limited to those workloads executing within virtualized computing elements of a virtualized computing environment. Thus, the policies implemented via micro-segmentation may be less effective since they are only applied in the virtual portion of a network unless the virtual computing environment has an agent executing on each physical computing system workload.

SUMMARY

The technology disclosed herein enables the micro-segmentation of a network without agents. In a particular embodiment, a method provides, in a packet-handler controller of a virtual computing environment, determining one or more policies in a first format that identify one or more packet characteristics and how packets with the one or more packet characteristics should be handled within the virtual computing environment. The method further provides converting the one or more policies from the first format to a second format used by a domain controller for one or more computing systems outside of the virtual computing environment. Also, the method provides distributing the one or more policies in the second format to at least one of the one or more computing systems.

In some embodiments, distributing the one or more policies in the second format comprises transferring the one or more policies in the second format to a domain controller server for the domain controller. The domain controller server transfers the one or more policies to the at least one of the one or more computing systems. In these embodiments, transferring the one or more policies in the second format to the domain controller server may include creating a secure Transmission Control Protocol (TCP) connection between the packet-handler controller and the domain controller server and pushing the one or more policies in the second format to the domain controller server over the secure TCP connection. Alternatively, transferring the one or more policies in the second format to the domain controller server may include converting the one or more policies in the second format to a template of the second format and copying the template to a folder that is accessible by the domain controller server, wherein the domain controller server monitors the folder for the template.

In some embodiments, the method provides, in the packet-handler controller, receiving feedback information from the domain controller server about the at least one of the one or more computing systems handling of network packets based on the one or more policies in the second format.

In some embodiments, the method further provides discovering the one or more computing systems in a network domain of the domain controller. In these embodiments, discovering the one or more computing systems may include querying a domain controller server for the domain controller to identify the one or more computing systems as having joined the network domain of the domain controller.

In some embodiments, the method provides discovering a plurality of applications executing within the virtual computing environment. In these embodiments, determining the one or more policies may include defining the one or more policies based on the plurality of applications.

In some embodiments, the domain controller comprises Active Directory and the second format comprises one or more Group Policy Objects.

In another embodiment, an apparatus implementing a packet-handler of a virtual computing environment is provided having one or more computer readable storage media and a processing system operatively coupled with the one or more computer readable storage media. Program instructions stored on the one or more computer readable storage media, when read and executed by the processing system, direct the processing system to determine one or more policies in a first format that identify one or more packet characteristics and how packets with the one or more packet characteristics should be handled within the virtual computing environment. The program instructions further direct the processing system to convert the one or more policies from the first format to a second format used by a domain controller for one or more computing systems outside of the virtual computing environment. Also, the program instructions direct the processing system to distribute the one or more policies in the second format to at least one of the one or more computing systems.

DETAILED DESCRIPTION

The implementations described herein allow for micro-segmentation policies to be implemented in both virtualized computing elements and physical computing elements. In particular, the micro-segmentation policies are implemented without the need for execution of agents of the virtual computing environment on the physical computing elements. The implementations leverage policy enforcement components built into the operating systems of the physical computing elements. Micro-segmentation policies that originate in the virtual computing environment are converted to a format understood by the policy enforcement components and then distributed to the physical computing elements. The policy enforcement components then implement the policies received from the virtual computing environment in the same manner as the physical elements would if the policies were received from some other source. The virtualized computing environment is therefore able to implement micro-segmentation policies beyond the virtualized computing elements that are under its direct control.

Figure 1:
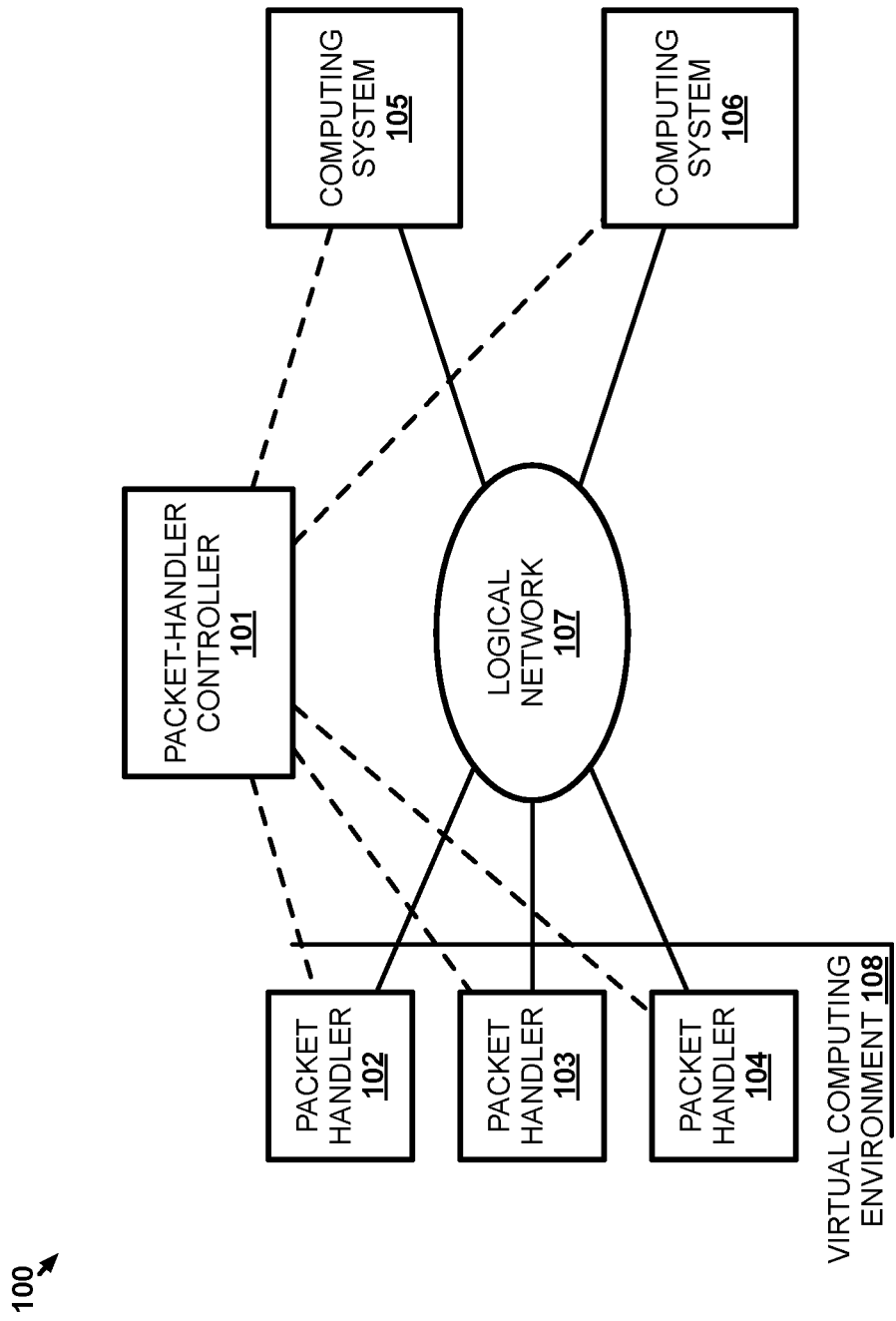
FIG. 1 illustrates an implementation for agent-less micro-segmentation of a network.

FIG. 1 illustrates implementation 100 for agent-less micro-segmentation of a network. Implementation 100 includes packet-handler controller 101, packet handler 102, packet handler 103, packet handler 104, computing system 105, computing system 106, and logical network 107. Packet handler 102, packet handler 103, and packet handler 104 are hosted elements within virtual computing environment 108. In some examples, packet-handler controller 101 may also be within virtual computing environment 108. For instance, packet-handler controller 101 may be implemented within a guest executing on a host of virtual computing environment 108. Packet handler 102, packet handler 103, packet handler 104, computing system 105, and computing system 106 exchange data communications over logical network 107. In some cases, packet-handler controller 101 may also communicate over logical network 107, although, packet-handler controller 101 may instead communicate over a control plane of virtual computing environment 108, some other logical network, or some other type of communication link with packet handler 102, packet handler 103, packet handler 104, computing system 105, and/or computing system 106. It should be understood that logical network 107 is an overlay network logically decoupled from, but built atop physical network devices and computing systems, such as routers, switches, access points, servers, etc., and allows for flexibility in network configurations beyond that provided by the underlying physical devices and systems, such as allowing for the connectivity of guests in virtual computing environment 108.

In operation, packet handler 102, packet handler 103, and packet handler 104 execute on one or more physical host computing systems and handle packets being exchanged with guests on those host computing systems. A host computing system includes hardware (e.g., microprocessor(s), memory, storage, physical network interface(s), etc.) and software (e.g., hypervisor) necessary to provide a virtualized computing system (e.g., virtual machine, container, etc.) on which a guest executes. Workloads, such as applications, execute within the guests. Each of packet handler 102, packet handler 103, and packet handler 104 may be associated with a single guest or may be associated with multiple guests. packet handler 102, packet handler 103, and packet handler 104, may each comprise a firewall to regulate what data packets can be exchanged with the guests associated, although other types of packet handlers may be used instead. computing system 105 and computing system 106 each comprise similar hardware to that described above for a host computing system. However, computing system 105 and computing system 106 do not host guests through software mechanisms, like a hypervisor. Rather, workloads execute directly on the hardware of computing system 105 and computing system 106. Since computing system 105 and computing system 106 are not in virtual computing environment 108 and, therefore, are not packet handlers akin to packet handler 102, packet handler 103, and packet handler 104, packet-handler controller 101 cannot control how packets are handled by computing system 105 and computing system 106 in the same manner as packet-handler controller 101 controls how packets are handled by packet handler 102, packet handler 103, and packet handler 104 (e.g., for micro-segmenting the workloads associated therewith).

Figure 2:
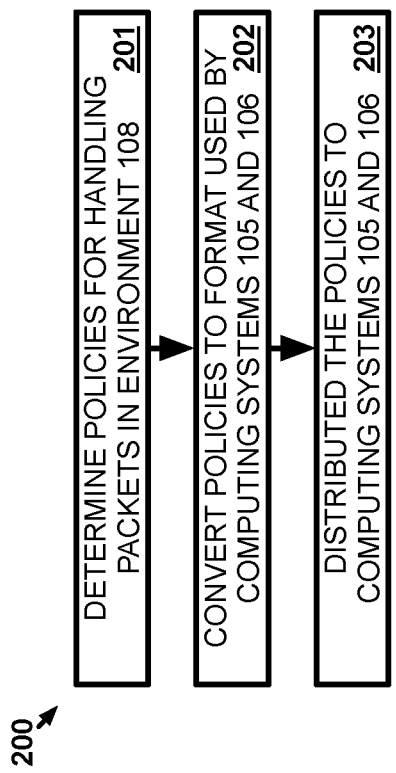
FIG. 2 illustrates a scenario for the implementation to micro-segment a network without agents.

FIG. 2 illustrates scenario 200 for implementation 100 to micro-segment a network without agents. In particular, while packet-handler controller 101 can micro-segment workloads on a portion of logical network 107 without agents (i.e., those workloads executing within guests of virtual computing environment 108) via packet handler 102, packet handler 103, and packet handler 104, no similar packet handler exists for computing system 105 and computing system 106, which are physical systems and are not systems virtualized on a host. However, the operating systems of computing system 105 and computing system 106 include their own packet handling components that can regulate the network traffic exchanged with workloads thereon. These components are sometimes called domain controllers. Packet-handler controller 101 leverages these domain controllers to implement micro-segmentation policies on computing system 105 and computing system 106.

In scenario 200, packet-handler controller 101 determines one or more policies that identify one or more packet characteristics and how packets with those packet characteristics should be handled within virtual computing environment 108 (201). The policies are in a format understood by packet handler 102, packet handler 103, and packet handler 104, and may be a format proprietary to virtual computing environment 108. Also, the policies may be defined in a traditional 5-tuple manner or may include one or more additional attributes, such as an attribute identifying a Level 7 based service or application. Other manners of defining network handling policies may also be used.

Scenario 200 then provides packet-handler controller 101 converting the policies from the format understood by packet handler 102, packet handler 103, and packet handler 104 to another, second, format used by a domain controller operating on computing system 105 and computing system 106 (202). The second format maintains the policy definitions from the previous format but, unlike the previous format, can be understood by computing system 105 and computing system 106. For example, if the domain controller is Microsoft's® Active Directory, then the format may comprise a Group Policy Object (GPO) for each policy.

Packet-handler controller 101 distributes the policies to policies in the second format to computing system 105 and computing system 106 (203). Packet-handler controller 101 may transfer the policies to computing system 105 and computing system 106 directly or may transfer the policies through an intermediate system, such as a domain controller server that manages the policies implemented by computing system 105 and computing system 106. In some cases, packet-handler controller 101, or the intermediate system, may determine which of the policies are relevant to which of computing system 105 and computing system 106. In those cases, computing system 105 and computing system 106 would only be sent the policies relevant thereto. In some examples, secure Transmission Control Protocol (TCP) connections, such as a Windows Management Instrumentation (WMI) or Secure Shell (SSH) connection, may be used to transfer the policies.

Advantageously, scenario 200 allows for policies defined and implemented in virtual computing environment 108 to also be implemented outside of virtual computing environment 108 in physical computing systems like computing system 105 and computing system 106. Moreover, implementation of the policies does not require an agent of packet-handler controller 101 to be executed on guests executing in virtual computing environment 108 or on computing system 105 and computing system 106. Rather, the policies are implemented in packet handler 102, packet handler 103, packet handler 104, and domain controllers of computing system 105 and computing system 106. The policies can then effectively micro-segment across virtual computing environment 108, computing system 105, and computing system 106.

Figure 3:
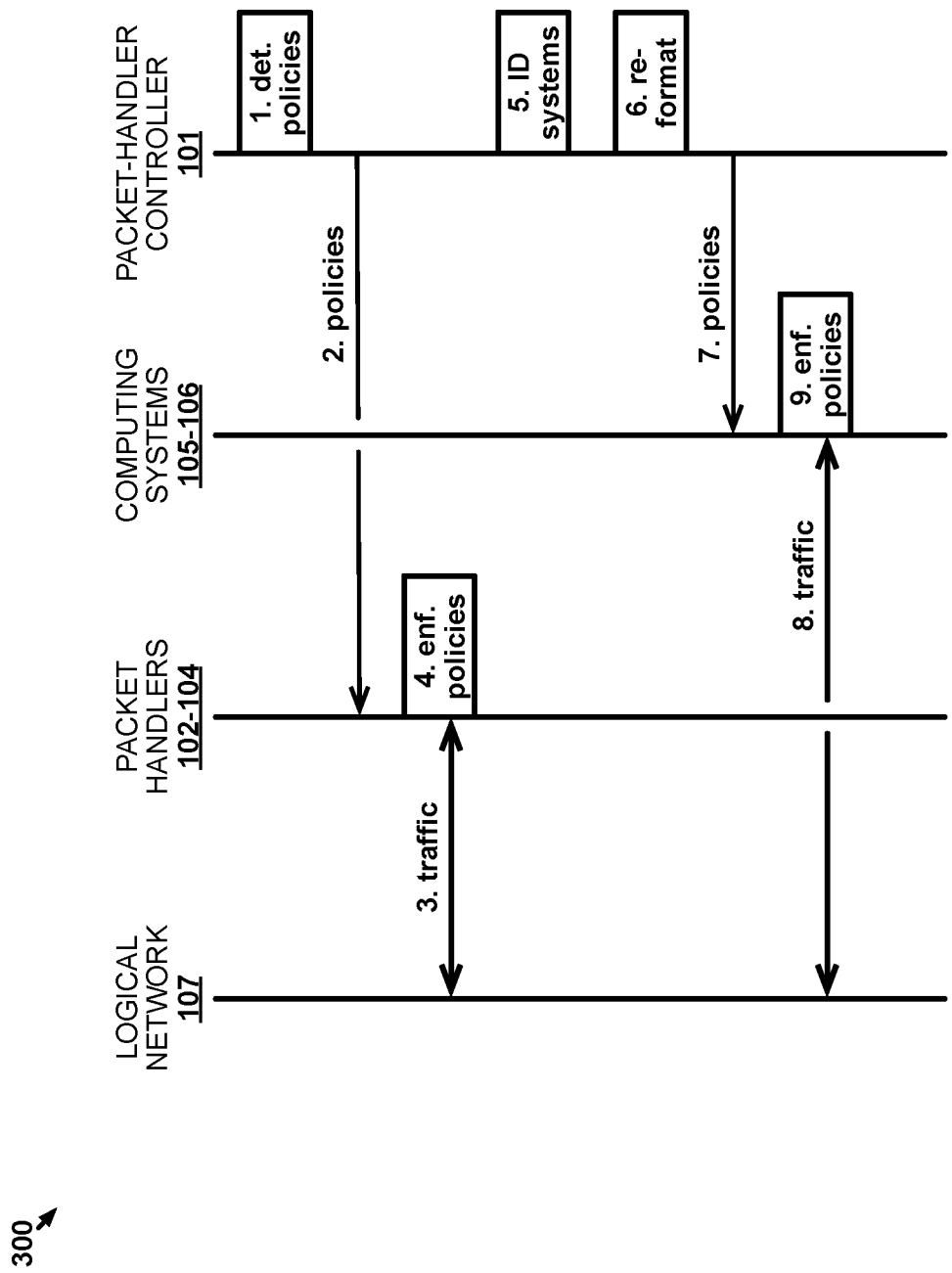
FIG. 3 illustrates another scenario for the implementation to micro-segment a network without agents.

FIG. 3 illustrates scenario 300 for implementation 100 to micro-segment a network without agents. At step 1, packet-handler controller 101 determines policies to be implemented on network traffic exchanged among elements of virtual computing environment 108 and computing system 105 and computing system 106. The policies may be defined by a user, may be automatically learned based on previous network traffic, or may be obtained in some other manner. The policies micro-segment logical network 107 by regulating which guests, or applications executing within guests, on logical network 107 can exchange network traffic among themselves and/or with systems external to logical network 107, such as over the Internet.

Those policies are distributed at step 2 to packet handler 102, packet handler 103, and packet handler 104. Packet handler 102, packet handler 103, and packet handler 104 may receive the policies over a control plane within virtual computing environment 108, as may be the case if packet-handler controller 101 is a guest within virtual computing environment 108, although other mechanisms may be used instead. After each of packet handler 102, packet handler 103, and packet handler 104, network traffic is exchanged at step 3 between logical network 107 and packet handler 102, packet handler 103, and packet handler 104. Packet handler 102, packet handler 103, and packet handler 104 enforce the policies on the network traffic.

Additionally, packet-handler controller 101 identifies physical computing systems in the domain of logical network 107 at step 5 that should enforce the policies as well. In this example, computing system 105 and computing system 106 are identified. In some examples, the identification of the physical computing systems may be performed by the intermediate system discussed above. Packet-handler controller 101 reformats the policies into a format understood by domain controller components of computing system 105 and computing system 106. The reformatted policies are distributed at step 7 to computing system 105 and computing system 106. The reformatted policies may be transferred over the data plane of logical network 107 or may be transferred over some other channel. After computing system 105 and computing system 106 each receive the reformatted policies, network traffic is exchanged at step 8 between logical network 107 and computing system 105 and computing system 106. Computing system 105 and computing system 106, via their respective domain controllers, enforce the reformatted policies at step 9 on the network traffic.

Upon completion of scenario 300, the policies defined at step 1 are implemented throughout logical network 107 in virtual computing environment 108 and computing system 105 and computing system 106. It should be understood that, while the sequence of scenario 300 shows the policies being sent to packet handler 102, packet handler 103, and packet handler 104 first (and consequently being enforced on network traffic first), the reformatted policies may be transferred to computing system 105 and computing system 106 at substantially the same time (so policy enforcement can be implemented at substantially the same time network wide) or, in some cases, even before.

Figure 4:
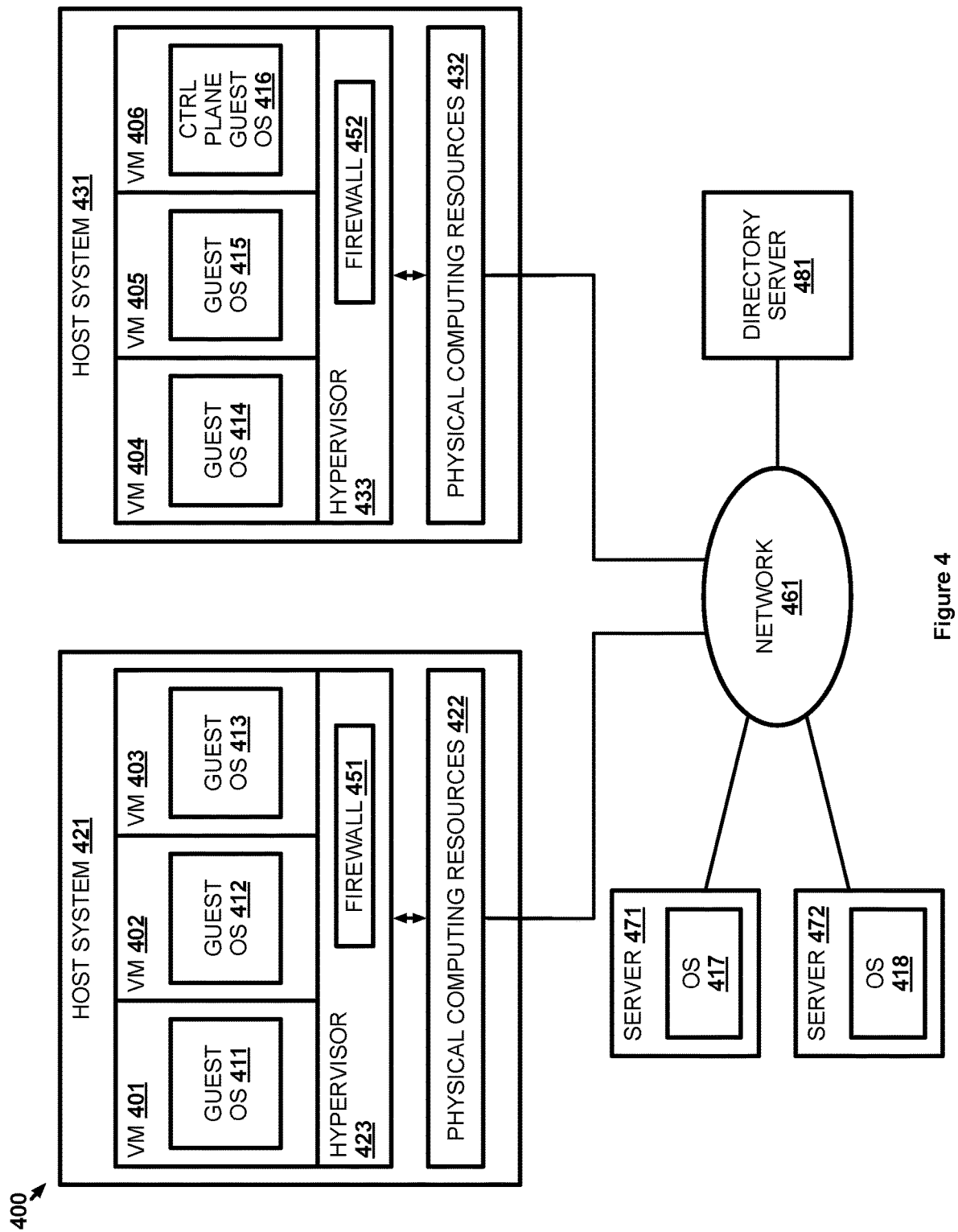
FIG. 4 illustrates another implementation for agent-less micro-segmentation of a network.

FIG. 4 illustrates implementation 400 for agent-less micro-segmentation of a network. Implementation 400 includes host computing system 421, host computing system 431, physical network 461, physical server 471, physical server 472, and domain controller server 481. physical network 461 may include the Internet, one or more local area networks, one or more wide area networks, and/or one or more other types of networks between computing systems.

In this example, host computing system 421 executes hypervisor 423 to allocate physical computing resources 422 among virtual machines 401-403. Likewise, host computing system 431 executes hypervisor 433 to allocate physical computing resources 432 among virtual machines 404-406. Physical computing resources 422 and 432 may include processing resources (e.g., processing circuitry, CPU time/cores, etc.), memory space (e.g., random access memory, hard disk drive(s), flash memory, etc.), network interfaces, user interfaces, or any other type of resource that a physical computing system may include. Hypervisor 423 and hypervisor 433 include distributed firewall instance 451 and distributed firewall instance 452, respectively. Distributed firewall instance 451 and distributed firewall instance 452 are packet handlers that virtualize the functions of a physical network firewall system for virtual machines provided by hypervisor 423 and hypervisor 433, respectively. Collectively, distributed firewall instance 451 and distributed firewall instance 452 may be referred to as a distributed firewall since firewall functions are distributed between multiple hosts, and in some instances may be managed from a user's perspective collectively as a single firewall.

It should be understood that the distribution of virtual machines evenly across two host computing systems, as shown in FIG. 4, is merely exemplary. The six virtual machines shown may instead be implemented on any number of host computing systems. Likewise, host computing systems 421 and 431 could host additional hosts (e.g., hypervisors) and virtual machines and/or other virtual elements that are not involved in this example.

Physical server 471, physical server 472, and domain controller server 481 each comprise physical computing resources similar to physical computing resources 422 and physical computing resources 432 of host computing system 421 and host computing system 431, respectively. However, rather than physical server 471 and physical server 472 hosting virtual machines with guest OSs thereon, OS 417 and OS 418 execute on the hardware of respective physical server 471 and physical server 472 directly. Domain controller server 481 may similarly have an OS executing thereon, although, in some examples, domain controller server 481 may be implemented in a virtual machine rather than being a physical computing system.

Figure 5:
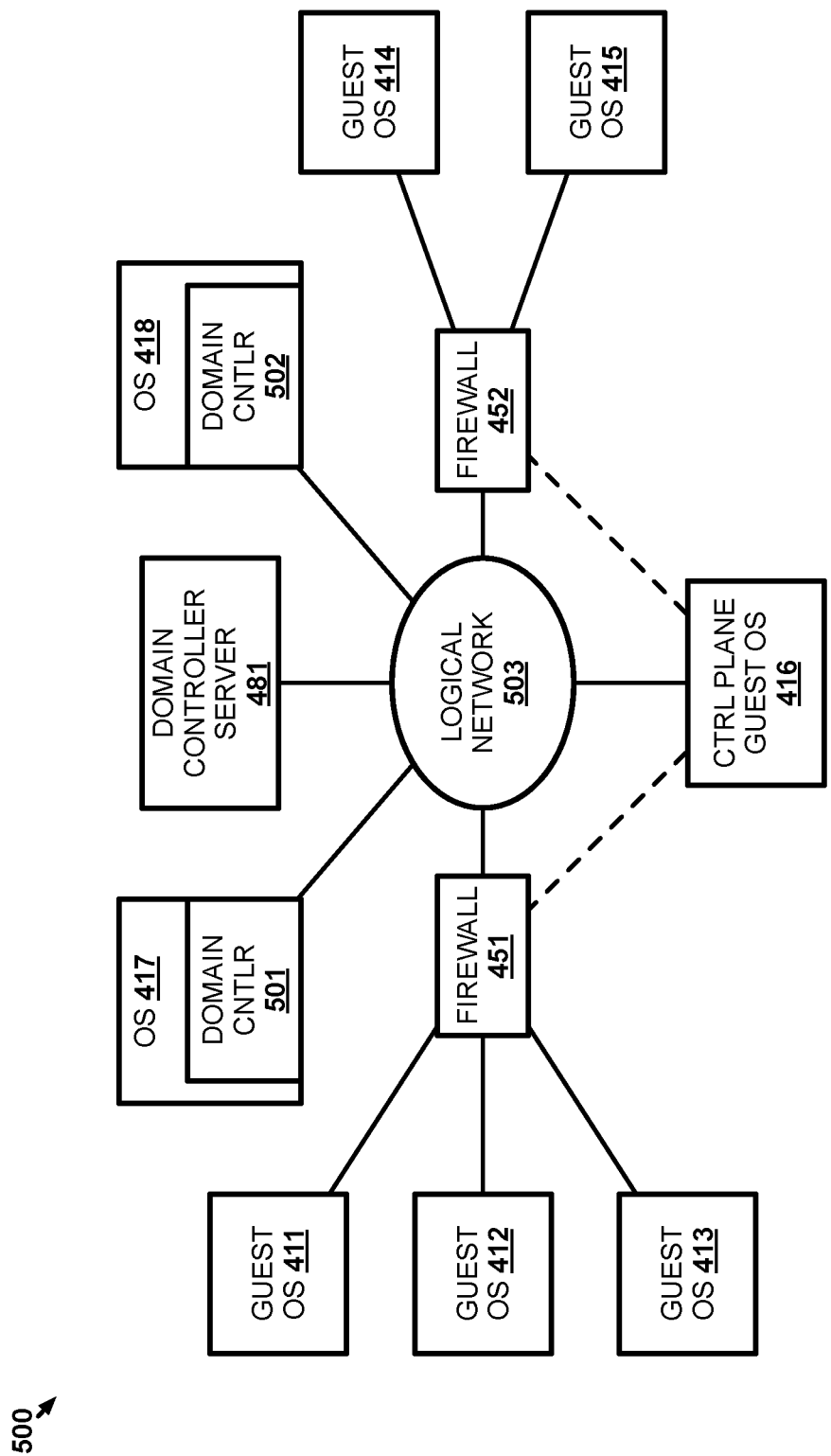
FIG. 5 illustrates a logical arrangement of the other implementation for agent-less micro-segmentation of a network.

FIG. 5 illustrates logical arrangement 500 of implementation 400 for agent-less micro-segmentation of a network. Logical arrangement 500 includes logical network 503 which is a logical overlay network on the resources of physical network 461, host computing system 421 and host computing system 431, including virtualized resources thereon (e.g., virtual network interfaces), physical server 471, and physical server 472. Logical network 503 networks guest OS 411, guest OS 412, guest OS 413, guest OS 414, guest OS 415, OS 417, and OS 418. While shown separately, distributed firewall instance 451 and distributed firewall instance 452 may be considered part of logical network 503. Logical network 503 may also be considered to include a logical network controller or controller cluster that configures firewall instances 451, 452 and communicates with domain controller server 481. While logical arrangement 500 includes only one distributed firewall instance per hypervisor to handle network packet traffic exchanged with guest OSs thereon, hosts in other examples may include additional distributed firewall instances, such as one instance per guest OS.

In operation, distributed firewall instance 451 regulates network traffic exchanged with guest OS 411, guest OS 412, and guest OS 413 over logical network 503. Likewise, distributed firewall instance 452 regulates network traffic exchanged with guest OS 414 and guest OS 415. Since OS 417 and OS 418 are not within the virtual environment provided by hypervisor 423 and hypervisor 433, OS 417 and OS 418 cannot rely on a distributed firewall instance like distributed firewall instance 451 and distributed firewall instance 452 to regulate network traffic exchanged therewith. Instead, OS 417 and OS 418 include domain controller 501 and domain controller 502, respectively. Domain controller 501 and domain controller 502 are packet handlers that are built into OS 417 and OS 418 to regulate network traffic exchanged with OS 417 and OS 418. If OS 417 and OS 418 are versions of the Microsoft Windows® OS, then domain controller 501 and domain controller 502 may be active directory. Other OSs, such as versions of the Linux OS, may include domain controllers that perform similar functions.

Domain controller server 481 handles the distribution of network policies to domain controller 501 and domain controller 502. Similarly, control plane guest OS 416 handles the distribution of network policies to distributed firewall instance 451 and distributed firewall instance 452, which enforce the policies. Control plane guest OS 416 uses the network policies to implement micro-segmentation between workloads executing on guest OS 411, guest OS 412, guest OS 413, guest OS 414, and guest OS 415. Micro-segmentation ensures that workloads only communicate with other workloads that are allowed by the network policies. Scenario 600, described below, enables the application of the policies to workloads that are not subject to the network traffic regulations of a distributed firewall instance, such as workloads executing on OS 417 and OS 418. Implementing the policies on OS 417 and OS 418 allows for micro-segmentation to be implemented across all of logical network 503.

Control plane guest OS 416 implements a control plane, through applications executing thereon, for the virtual environment provided by hypervisor 423 and hypervisor 433. While this disclosure focuses on control plane guest OS 416 with respect to its control over distributed firewall instance 451 and distributed firewall instance 452, control plane guest OS 416 may control any number of aspects for the virtual environment.

Figure 6:
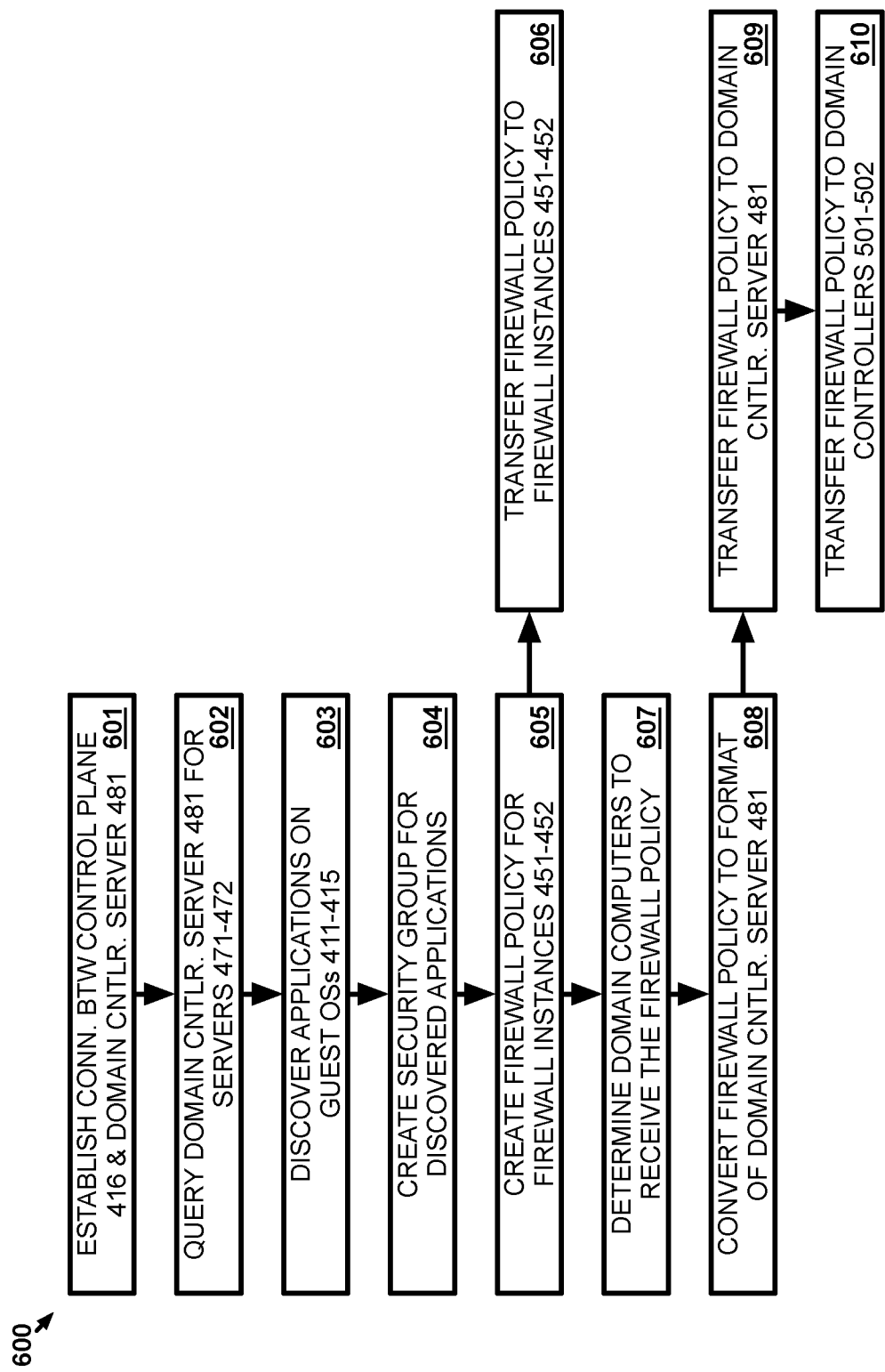
FIG. 6 illustrates a scenario for the other implementation to micro-segment a network without agents.

FIG. 6 illustrates scenario 600 for implementation 400 to micro-segment a network without agents. In scenario 600, a connection is established between control plane guest OS 416 and domain controller server 481 (601). Preferably, the connection is a type of secure TCP connection. If domain controller server 481 is an Active Directory server for Windows OSs, then the secure TCP connection may be a WMI connection. Alternatively, if domain controller server 481 a server for other OSs, such as Linux, the secure TCP connection may be an SSH connection. Over the established connection, control plane guest OS 416 queries domain controller server 481 to discover all the computing systems that have joined the domain of logical network 503 (602). In this example, those computing systems are physical server 471 and physical server 472. Domain controller server 481 may maintain a security group labelled "Domain Computers," or similar, that includes all computers that have joined the domain. As such, in some examples, control plane guest OS 416 may query domain controller server 481 for the identities of computers in the Domain Computers security group to identify physical server 471 and physical server 472.

Additionally, control plane guest OS 416 discovers application processes executing on guest OS 411, guest OS 412, guest OS 413, guest OS 414, and guest OS 415 (603). The application processes may be identified by monitoring network traffic exchanged with guest OS 411, guest OS 412, guest OS 413, guest OS 414, and guest OS 415 via distributed firewall instance 451 and distributed firewall instance 451, respectively, or via some other packet handler provided by hypervisor 423 and hypervisor 433 the data paths of guest OS 411, guest OS 412, guest OS 413, guest OS 414, and guest OS 415. control plane guest OS 416 then creates security groups for the discovered applications (604). control plane guest OS 416 may receive input from a user indicating which applications should go into which security groups, may use already known security group definitions for application placement, or may create security groups in some other manner. Each security group contains one or more applications. For example, a security group may be defined to include a specific type of web browser application or may be defined to include different types of web browser applications. Other ways of defining which applications belong in which security group may also be used.

Control plane guest OS 416 creates firewall policies to implement micro-segmentation of the security groups (605). The firewall policies may include rules that indicate with which other security groups applications in a particular security group can exchange communications. A firewall policy may explicitly allow network traffic exchanged with one or more security groups or may explicitly deny network traffic exchanged with one or more security groups. In some cases, a firewall policy may allow outgoing traffic to a security group but not allow incoming traffic, or vice versa. A firewall policy may further regulate whether applications in a security group can communicate with applications outside of logical network 503, such as another logical network or the Internet. The firewall policies may be received from a user or control plane guest OS 416 may automatically create the firewall policies (e.g., by learning from past network traffic exchanged between applications in each security group). The created firewall policies are transferred to distributed firewall instance 451 and distributed firewall instance 452, where the policies are implemented to regulate traffic exchanged with applications executing on guest OS 411, guest OS 412, guest OS 413, guest OS 414, and guest OS (606).

To expand the micro-segmentation provided by the firewall policies outside of distributed firewall instance 451 and distributed firewall instance 452, control plane guest OS 416 determines which of the identified domain computers physical server 471 and physical server 472 should receive the firewall policies (607). In some cases, all domain computers may receive all the firewall policies, although, in other cases, each domain computer will receive only those policies that may be relevant to that computer. For example, control plane guest OS 416 may be informed about the application processes executing in OS 417 and OS 418 and only distribute firewall policies to physical server 471 and physical server 472 that pertain to the respective applications. A user may provide the application information to control plane guest OS 416 or control plane guest OS 416 may receive the information from some other source, such as from OS 417 and OS 418 themselves, from distributed firewall instance 451 and distributed firewall instance 452 analyzing traffic exchanged with OS 417 and OS 418, or from some other source. While only physical server 471 and physical server 472 were determined to be domain computers in this example, it is possible that one or both of host computing system 421 and host computing system 431 could also be domain computers and have applications executing within non-guest OSs thereon.

Before sending the firewall policies to domain controller server 481, control plane guest OS 416 first converts the firewall policies to a format understood by domain controller server 481 (608). The firewall policies are converted from the format used by distributed firewall instance 451 and distributed firewall instance 452. In examples where domain controller server 481 is an Active Directory server, the format to which each of the firewall policies are converted is a Group Policy Object (GPO). OS 417 and OS 418 would therefore be Windows based OSs and domain controller 501 and domain controller 502 would implement Active Directory policies for OS 417 and OS 418, respectively. Other types of domain controllers may use formats other than the GPO format to which the firewall policies are converted by control plane guest OS 416.

Control plane guest OS 416 transfers the converted firewall policies to domain controller server 481 (609). The converted firewall policies may indicate to which of physical server 471 and physical server 472 each policy should be sent if the firewall policies are not intended for all domain computers. In one example, the converted firewall policies are transferred to domain controller server 481 over the secure TCP connection between control plane guest OS 416 and domain controller server 481. In another example, specifically in an Active Directory example, the GPOs are converted into a standard GPO template and copied to a shared folder to which domain controller server 481 has access. The shared folder may be within control plane guest OS 416 or may be stored elsewhere on host computing system 431 or stored on another storage accessible by domain controller server 481 (e.g., over physical network 461). Domain controller server 481 monitors that shared folder for GPO templates. For instance, domain controller server 481 may execute a PowerShell script to monitor the shared folder and then invoke a command to update the group policy of domain computers (i.e., physical server 471 and physical server 472) with the GPOs in the template.

After receiving the converted firewall policies, domain controller server 481 distributes the policies to domain controller 501 and domain controller 502 of physical server 471 and physical server 472, respectively (610). The policies are distributed in the same manner domain controller server 481 would have if the policies were initially created in the format of domain controller server 481. Upon distributed firewall instance 451 and distributed firewall instance 452 receiving the firewall policies from control plane guest OS 416 and domain controller 501 and domain controller 502 receiving the converted policies from domain controller server 481, micro-segmentation is implemented for applications executing on guest OS 411, guest OS 412, guest OS 413, guest OS 414, guest OS 415, OS 417, and OS 418 by distributed firewall instance 451, distributed firewall instance 452, domain controller 501, and domain controller 502 enforcing the firewall policies in their respective formats.

In some examples, control plane guest OS 416 may receive feedback about the efficacy of the firewall policies, or other information relevant to the enforcement of the firewall policies. In these examples, control plane guest OS 416 receives the feedback from distributed firewall instance 451 and distributed firewall instance 452 directly. Control plane guest OS 416 receives feedback from domain controller server 481 after domain controller 501 and domain controller 502 report the feedback to domain controller server 481.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method for agent-less micro-segmentation of a network, the method comprising:
    in a packet-handler controller of a virtual computing environment, determining one or more policies in a first format that identify one or more packet characteristics and how packets with the one or more packet characteristics should be handled within the virtual computing environment;
    implementing the one or more policies in the first format within the virtual computing environment by transferring the one or more policies to one or more packet handlers in the virtual computing environment that enforce the one or more policies in the first format;
    converting the one or more policies from the first format to a second format used by a domain controller for one or more computing systems outside of the virtual computing environment; and
    distributing the one or more policies in the second format to at least one of the one or more computing systems that enforce the one or more policies in the second format.

2. The method of claim 1, wherein distributing the one or more policies in the second format comprises:
    transferring the one or more policies in the second format to a domain controller server for the domain controller, wherein the domain controller server transfers the one or more policies to the at least one of the one or more computing systems.

3. The method of claim 2, wherein transferring the one or more policies in the second format to the domain controller server comprises:
    creating a secure Transmission Control Protocol (TCP) connection between the packet-handler controller and the domain controller server; and
    pushing the one or more policies in the second format to the domain controller server over the secure TCP connection.

4. The method of claim 2, wherein transferring the one or more policies in the second format to the domain controller server comprises:
    converting the one or more policies in the second format to a template of the second format; and copying the template to a folder that is accessible by the domain controller server, wherein the domain controller server monitors the folder for the template.

5. The method of claim 2, further comprising:
in the packet-handler controller, receiving feedback information from the domain controller server about the at least one of the one or more computing systems handling of network packets based on the one or more policies in the second format.

6. The method of claim 1, further comprising:
discovering the one or more computing systems in a network domain of the domain controller.

7. The method of claim 6, wherein discovering the one or more computing systems comprises:
querying a domain controller server for the domain controller to identify the one or more computing systems as having joined the network domain of the domain controller.

8. The method of claim 1, further comprising:
discovering a plurality of applications executing within the virtual computing environment.

9. The method of claim 8, wherein determining the one or more policies comprises:
defining the one or more policies based on the plurality of applications.

10. The method of claim 1, wherein the domain controller comprises Active Directory and the second format comprises one or more Group Policy Objects.

11. An apparatus, having physical computing resources, implementing a packet-handler controller of a virtual computing environment for agent-less micro-segmentation of a network, the apparatus comprising:
one or more computer readable storage media of the physical computing resources;
a processing system of the physical computing resources operatively coupled with the one or more computer readable storage media; and
program instructions stored on the one or more computer readable storage media that, when read and executed by the processing system, direct the processing system to:
determine one or more policies in a first format that identify one or more packet characteristics and how packets with the one or more packet characteristics should be handled within the virtual computing environment;
implement the one or more policies in the first format within the virtual computing environment by transferring the one or more policies to one or more packet handlers in the virtual computing environment that enforce the one or more policies in the first format;
convert the one or more policies from the first format to a second format used by a domain controller for one or more computing systems outside of the virtual computing environment; and
distribute the one or more policies in the second format to at least one of the one or more computing systems that enforce the one or more policies in the second format.

12. The apparatus of claim 11, wherein to distribute the one or more policies in the second format, the program instructions direct the processing system to:
transfer the one or more policies in the second format to a domain controller server for the domain controller, wherein the domain controller server transfers the one or more policies to the at least one of the one or more computing systems.

13. The apparatus of claim 12, wherein to transfer the one or more policies in the second format to the domain controller server, the program instructions direct the processing system to:
create a secure Transmission Control Protocol (TCP) connection between the packet-handler controller and the domain controller server; and
push the one or more policies in the second format to the domain controller server over the secure TCP connection.

14. The apparatus of claim 12, wherein to transfer the one or more policies in the second format to the domain controller server, the program instructions direct the processing system to:
convert the one or more policies in the second format to a template of the second format; and
copy the template to a folder that is accessible by the domain controller server, wherein the domain controller server monitors the folder for the template.

15. The apparatus of claim 12, wherein the program instructions further direct the processing system to:
receive feedback information from the domain controller server about the at least one of the one or more computing systems handling of network packets based on the one or more policies in the second format.

16. The apparatus of claim 11, wherein the program instructions further direct the processing system to:
discover the one or more computing systems in a network domain of the domain controller.

17. The apparatus of claim 16, wherein to discover the one or more computing systems, the program instructions direct the processing system to:
query a domain controller server for the domain controller to identify the one or more computing systems as having joined the network domain of the domain controller.

18. The apparatus of claim 11, wherein the program instructions further direct the processing system to:
discover a plurality of applications executing within the virtual computing environment.

19. The apparatus of claim 18, wherein to determine the one or more policies, the program instructions direct the processing system to:
define the one or more policies based on the plurality of applications.

20. The apparatus of claim 11, wherein the domain controller comprises Active Directory and the second format comprises one or more Group Policy Objects.

* * * * *